United States Patent
Xu et al.

(10) Patent No.: US 10,951,656 B2
(45) Date of Patent: Mar. 16, 2021

(54) METHODS, APPARATUS AND SYSTEMS TO USE ARTIFICIAL INTELLIGENCE TO DEFINE ENCRYPTION AND SECURITY POLICIES IN A SOFTWARE DEFINED DATA CENTER

(71) Applicant: Nicira, Inc., Palo Alto, CA (US)

(72) Inventors: Gang Xu, Palo Alto, CA (US); Xinghua Hu, San Jose, CA (US); Yong Wang, San Jose, CA (US); Shadab Shah, Fremont, CA (US); Sharath Bhat, Santa Clara, CA (US); Yashika Narang, Sunnyvale, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 15/678,939

(22) Filed: Aug. 16, 2017

(65) Prior Publication Data

US 2019/0058734 A1 Feb. 21, 2019

(51) Int. Cl.
*G06F 17/28* (2006.01)
*H04W 12/00* (2009.01)
(Continued)

(52) U.S. Cl.
CPC .......... *H04L 63/20* (2013.01); *H04L 63/0263* (2013.01); *H04L 63/0428* (2013.01);
(Continued)

(58) Field of Classification Search
CPC ....... H04L 67/02; H04L 67/10; H04L 51/046; H04L 67/22; H04L 51/066; H04L 63/20;
(Continued)

(56) References Cited

U.S. PATENT DOCUMENTS 6,574,628 B1 6/2003 Kahn et al.
6,978,379 B1 * 12/2005 Goh ...................... G06F 21/604
713/1

(Continued)

OTHER PUBLICATIONS

BMC Software, "Cloud Lifecycle Management Managing Cloud Services from Request to Retirement," 2010, 8 pages.

(Continued)

*Primary Examiner* — Jung W Kim
*Assistant Examiner* — Howard H. Louie
(74) *Attorney, Agent, or Firm* — Hanley, Flight & Zimmerman, LLC (57) ABSTRACT

Methods, apparatus and articles of manufacture to use artificial intelligence to define encryption and security policies in a software defined data center are disclosed. Example apparatus include a language parser to parse a natural language statement into a policy statement that defines a distributed network encryption policy or a distributed network security policy. Example apparatus also include a comparator to compare the policy statement to a set of reference policy templates and a template configurer to select a first policy template from the set of reference policy templates in response to the comparator determining the first policy template corresponds to the policy statement. A policy distributor distributes a policy rule defined by the first policy template for enforcement at network nodes of a software defined data center. The policy rule is a distributed network encryption policy rule or a security policy rule.

16 Claims, 9 Drawing Sheets

(51) Int. Cl.
*H04W 12/08* (2009.01)
*H04L 29/06* (2006.01)

(52) U.S. Cl.
CPC ............ *H04L 63/062* (2013.01); *H04L 63/14* (2013.01); *H04L 63/1441* (2013.01)

(58) Field of Classification Search
CPC ... H04L 63/0428; H04L 63/062; H04L 63/14; H04L 63/0263; H04L 63/1441; H04L 65/403; H04L 51/02; H04L 51/24; H04L 51/26; H04L 63/1425; G06F 17/28; H04W 12/00; H04W 12/08
See application file for complete search history.

(56) References Cited

U.S. PATENT DOCUMENTS

| | | | |
|---|---|---|---|
| 8,356,067 | B2 | 1/2013 | Trantow |
| 8,521,725 | B1 | 8/2013 | Pearson et al. |
| 8,745,401 | B1 | 6/2014 | Hintz et al. |
| 8,868,590 | B1 | 10/2014 | Donneau-Golencer |
| 8,996,687 | B2 | 3/2015 | Zadig |
| 9,223,852 | B2 | 12/2015 | Lopitaux et al. |
| 9,577,896 | B2 | 2/2017 | Zadig |
| 10,075,442 | B2 | 9/2018 | Simpson et al. |
| 10,250,539 | B2 | 4/2019 | Simpson et al. |
| 10,257,143 | B2 | 4/2019 | Simpson et al. |
| 10,467,300 | B1 | 11/2019 | Jastrzebski et al. |
| 2006/0143057 | A1 | 6/2006 | Sadiq |
| 2008/0046394 | A1 | 2/2008 | Zhou et al. |
| 2009/0164499 | A1* | 6/2009 | Samudrala ............ G06F 21/604 |
| 2011/0202439 | A1 | 8/2011 | Ricci |
| 2011/0276601 | A1 | 11/2011 | Pin et al. |
| 2011/0302098 | A1 | 12/2011 | Yoshida et al. |
| 2012/0116982 | A1 | 5/2012 | Yoshida et al. |
| 2012/0310922 | A1 | 12/2012 | Johnson et al. |
| 2013/0091582 | A1 | 4/2013 | Chen et al. |
| 2013/0218885 | A1 | 8/2013 | Satyanarayanan |
| 2014/0041055 | A1 | 2/2014 | Shaffer et al. |
| 2014/0181817 | A1 | 6/2014 | Muller et al. |
| 2014/0245141 | A1 | 8/2014 | Yeh et al. |
| 2014/0280595 | A1 | 9/2014 | Mani et al. |
| 2014/0337914 | A1 | 11/2014 | Canning et al. |
| 2015/0066624 | A1 | 3/2015 | Astore |
| 2015/0127406 | A1 | 5/2015 | Hoen, IV et al. |
| 2015/0161260 | A1 | 6/2015 | Balani et al. |
| 2015/0161560 | A1 | 6/2015 | Burckart et al. |
| 2015/0213083 | A1 | 7/2015 | Brooks et al. |
| 2015/0358303 | A1 | 12/2015 | Hui et al. |
| 2015/0379277 | A1 | 12/2015 | Thota et al. |
| 2016/0021037 | A1 | 1/2016 | Hewitt et al. |
| 2016/0036860 | A1* | 2/2016 | Xing .................. G06F 21/6227 726/1 |
| 2016/0094507 | A1 | 3/2016 | Li et al. |
| 2016/0110810 | A1 | 4/2016 | Ashok et al. |
| 2016/0127553 | A1 | 5/2016 | McCormack et al. |
| 2016/0189315 | A1 | 6/2016 | Anania et al. |
| 2016/0226719 | A1 | 8/2016 | Ong et al. |
| 2016/0234250 | A1* | 8/2016 | Ashley .................. H04L 63/105 |
| 2016/0283983 | A1 | 9/2016 | Kalb et al. |
| 2016/0328758 | A1 | 11/2016 | Rasansky |
| 2017/0004182 | A1 | 1/2017 | Simpson et al. |
| 2017/0005967 | A1 | 1/2017 | Simpson et al. |
| 2017/0041265 | A1 | 2/2017 | Simpson et al. |
| 2017/0041435 | A1 | 2/2017 | Simpson et al. |
| 2017/0134903 | A1 | 5/2017 | Zadig |
| 2017/0180320 | A1* | 6/2017 | Nimmagadda ..... H04L 63/0263 |
| 2018/0063103 | A1 | 3/2018 | Jahid et al. |
| 2018/0063193 | A1 | 3/2018 | Chandrashekhar et al. |
| 2018/0069899 | A1* | 3/2018 | Lang ........................ H04L 63/20 |
| 2018/0137121 | A1 | 5/2018 | Agarwal |

OTHER PUBLICATIONS

Gottopati et al., "Finding Relevant Answers in Software Forums," Proceedings of the 26th IEEE/ACM International Conference on Automated Software Engineering (ASE 2011), Nov. 6-10, 2001, 11 pages.

Mell et al., "The NIST Definition of Cloud Computing," NIST Special Publication 800-145, Sep. 2011, 7 pages.

Lheureux, "Cloud Services Brokerage," 2013, 2 pages. Retrieved from http://www.gartner.com/technology/research/cloud-computing/report/cloud-services-brokerage.jsp.

Forrester Research, "Social Business: Delivering Critical Business Value," A Custom Technology Adaptation Profile Commissioned by Vmware, Apr. 2012, 7 pages.

Dancy, "Social IT, People as a Platform," May 2012, 8 pages. Retrieved from http://www.servicesphere.com/blog/2012/5/9/what-is-social-it.html.

Socialcast, "Socialcast Developer API," 136 pages. Retrieved Dec. 10, 2011, from https://web.archive.org/web/20111210051856/http://socialcast.com/resources/api.html.

Apache Software Foundation, "OpenNLP," 2017, 2 pages. Retrieved from http://opennlp.apache.org/.

Princeton University, "About WordNet," Mar. 17, 2015, 3 pages. Retrieved from http://wordnet.princeton.edu/.

Porter, "The Porter Stemming Algorithm," Jan. 2006, 7 pages. Retrieved from http://tartarus.org/~martin/PorterStemmer/.

Jack of All Clouds, "Anatomy of an Amazon EC2 Re-source ID," Sep. 21, 2009, 8 pages. Retrieved from hiittp://web.archive.org/web/20100314215931/http://www.jackofallclouds.com/2009/09/anatomy-of-an-amazon-ec2-resource-id/.

Rumburg, "Staffing the Desktop Support Function: How Many Technicians Do You Need?" 2012, 5 pages. Retrieved from http://www.servicemanagemenffusion.com/conference/~/media/HDIConf/2012/Files/White%20Papers/Rumburg%20-%20Optimal%20Staffing%20Desktop%20Support.pdf.

Dancy "1862 vs. 2013—Form-based Workflow Should be Dead," 2013, 26 pages. Retrieved from https://plus.google.com/110210255323789498026/posts/ VPkAQsfUiPV.

Servicenow, "Social IT," Product Documentation, Oct. 3, 2012, 2 pages. Retrieved from https://wiki.servicenow.com/index.php?title=Social_IT.

IT Smartdesk Ltd., "Product Homepage," 2012, 5 pages. Retrieved from http://web.archive.org/web/20121003153512/http://www.itsmartdesk.com.

Zendesk, "Customer Service Software and Support Ticket System," Product Homepage, 2017, 4 pages. Retrieved from http://www.zendesk.com.

Wikipedia, "Office Assistant," 2013, 7 pages. Retrieved from http://en.wikipedia.org/wiki/Office_Assistant.

EMC Corporation, "EMC Ionix Service Manager Version 9.0—API User Guide," Mar. 2010, 30 pages.

Virtualization Impact, "VMware Socialcast Named IDC's Leader in the Social Enterprise Space," Nov. 6, 2012, 2 pges. Retrieved from http://virtualizationimpact.com/?p=2104.

Rhodes, "Avoiding the War Room," IBM Systems Magazine, Mainframe Edition, Nov. 2010, 3 pages. Retrieved from http://media.bmc.com/edu/BMCWhtppr_Sept_Reprint.pdf.

Salesforce, "Help Desk Software, Customer Service App for Small Businesses," Product Overview, 6 pages. Retrieved from http://salesforce.com/products/desk/overview.

Yahoo! Inc., "Yahoo! Answers Homepage," 2017, 2 pages. Retrieved from http://answers.yahoo.com/.

Yelp Inc., "Yelp Homepage," 2017, 4 pages. Retrieved from http://www.yelp.com.

Vmware, Inc., "vCloud Automation Center API—6.2.1," VMware vRealize Automation 6.2 Information Center, 65 pages, Apr. 1, 2015. Retrieved from https://pubs.vmware.com/vra-62/index.jsp#com.vmware.vra.restapi.doc/index.html.

Butt, "APM &DevOPS: How to Collaborate Effectively with the Virtual War Room," Application Performance Monitoring Blog, Dec. 4, 2014, 5 pages. Retrieved from https://blog.appdynamics.com/devops/get-better-at-devops-with-virtual-war-room.

(56) References Cited

OTHER PUBLICATIONS

Butt, "APM &DevOPS: How to Collaborate Effectively with the Virtual War Room," Application Performance Monitoring Blog, Dec. 4, 2014, 3 pages. Retrieved from https://blog.appdynamics.com/devops/get-better-at-devops-with-virtual-war-room.

* cited by examiner

Security Policy

NAME

Service — 402

Action — 404

Source — 406

Destination — 408

NOTES — 409

SAVE    CANCEL

FIG. 4A

Key Policy

NAME — 410
Action — 412
Source — 414
Destination — 416
Encryption Algorithm — 418
Key Strength — 420
Rotate Key Every — 422
NOTES

SAVE    CANCEL

METHODS, APPARATUS AND SYSTEMS TO USE ARTIFICIAL INTELLIGENCE TO DEFINE ENCRYPTION AND SECURITY POLICIES IN A SOFTWARE DEFINED DATA CENTER

FIELD OF THE DISCLOSURE

The present disclosure relates generally to software defined data centers and, more particularly, to using artificial intelligence to define encryption and security policies in a software defined data center.

BACKGROUND

Enterprises (e.g., financial service providers, healthcare providers, critical infrastructure providers) store valuable data, and transfer it over networks. Information spreads across datacenters often through dedicated telco-provided networks. Overlay networks can also provide similar service via a public cloud services provider's network, but such communications are susceptible to threats such as snooping, man in the middle attack (MITM), and forging if the provider's network is compromised in some way. As enterprises widely adopt provider cloud-based multi-tenant infrastructure services instead of dedicated datacenters, new challenges are introduced, and protecting the data flowing into, within, and out of the multi-tenant cloud becomes a necessity. In addition, the privacy and security traditionally associated with conventional private enterprise datacenters can no longer be assumed. Thus, cryptography and firewalls may be used, not just at the edge, but also within public as well as private clouds to protect data and communication channels from malicious parties, provide confidentiality to enterprise dataflow in the cloud, and provide the enterprise with better control over its own data. To permit enterprise control over security and encryption rules, an enterprise system administrator, who has knowledge of the specialized format required to define such rules, crafts rules suited to the enterprise at a network management tool for subsequent delivery to and enforcement at a set of compute nodes of the data center.

BRIEF DESCRIPTION OF THE DRAWINGS

The figures are not to scale. Wherever possible, the same reference numbers will be used throughout the drawing(s) and accompanying written description to refer to the same or like parts, elements, etc.

DETAILED DESCRIPTION

As cloud-based Software-Defined Data Centers (SDDCs), instead of dedicated data centers, become more widely used, enterprises are developing greater measures to protect the data flowing into, within, and out of the cloud. Distributed network encryption and distributed network firewalls are two such measures. To permit enterprise control over security (firewall) and encryption rules used to implement distributed network encryption and distributed network firewalls, an enterprise system administrator, who has knowledge of the specialized format required to define such rules, uses that knowledge to craft rules suited to the enterprise. The rules are then provided by a network management tool to a set of compute nodes of the SDDC for enforcement. However, the expertise, training and skill required of the system administrator to define encryption and security rules that adequately protect enterprise data can be significant.

Example methods, apparatus and systems disclosed herein facilitate the development of encryption and/or security policies and rules through the use of artificial intelligence in the form of a natural language processing (NLP) parser. Example methods, apparatus and systems include a user interface at which a user enters a natural language statement identifying the desired policy/rule to be implemented in an SDDC. An example NLP parser parses the natural language statement to identify key words included in the natural language statement. An example comparator uses the key words to identify a corresponding policy template from among a set of reference policy templates. An example tenant group applicator identifies (e.g., based on user input) a set of compute nodes at which the rule is to be enforced and an example template converter then converts the template into an encryption or security rule in a format that is understandable by encryption and security enforcement tools residing at the compute network nodes of the SDDC. The rule is subsequently transmitted to the compute nodes of the SDDC for enforcement/application thereat.

Figure 1:
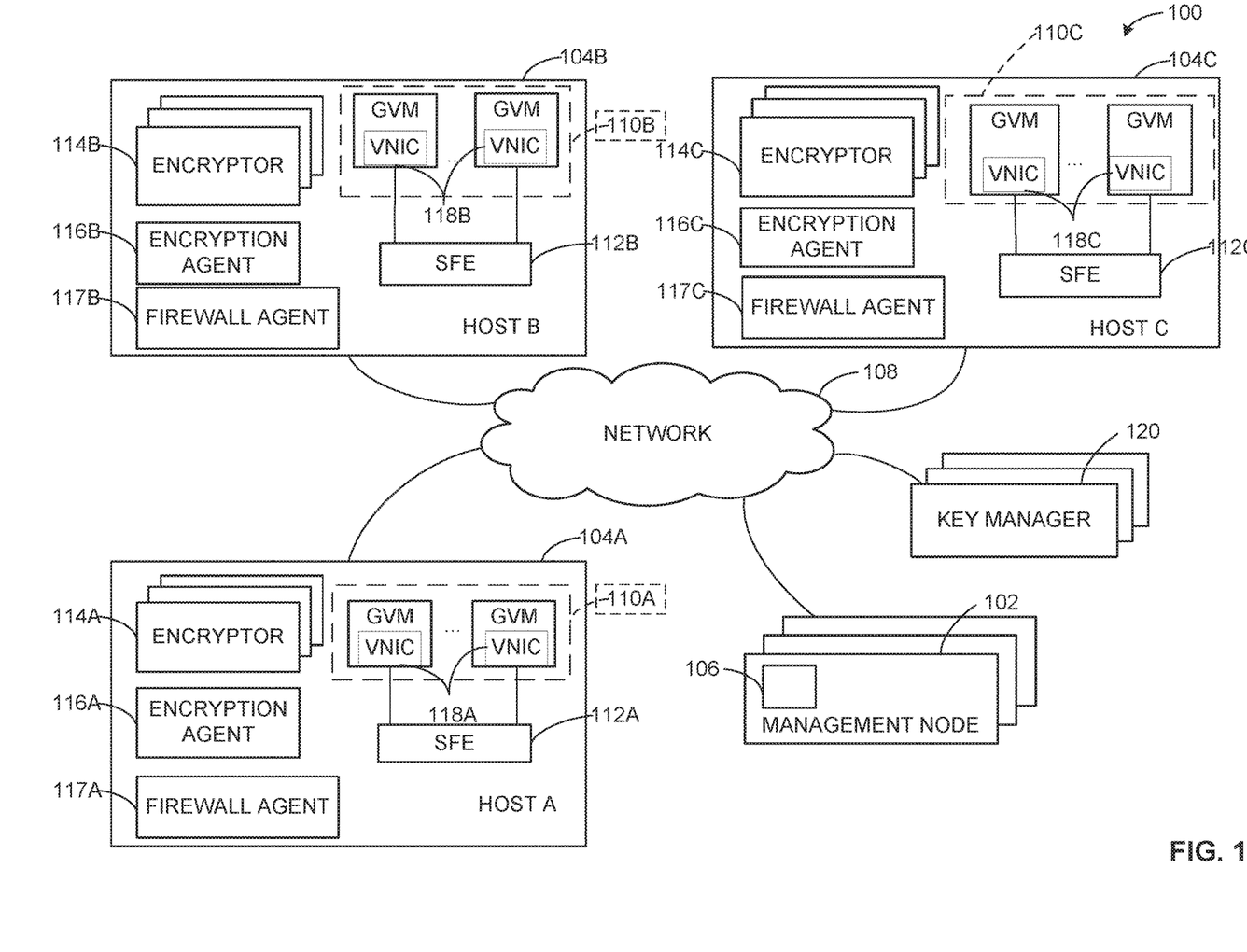
FIG. 1 depicts an example cloud-based software defined data center having an example management node constructed in accordance with the teachings of this disclosure.

FIG. 1 depicts an example cloud-based software defined data center software (SDDC) 100 having an example management node 102 and a set of example host nodes including a Host A 104A, a Host B 104B, and a Host C 104C. The example management node 102 includes an example security and encryption policy and rule generating system 106, as well as any other tools needed to provision, implement and manage nodes of the SDDC 100. The management node 102, Host A 104A, Host B 104B, and Host C 104C communicate via a network 108, which may comprise one or more networks each of which may comprise one or more local area networks (LANs), wide area networks (WANs), and/or a network of networks (e.g., the Internet), etc.

In some examples, Host A 104A, Host B 104B, and/or Host C 104C, etc. are implemented using processors on which example guest virtual machines 110A, 110B, 110C have been instantiated. A software forwarding element (SFE) 112A, 112B, 112C installed on each respective Host operates to transmit data received at the respective Host to a virtual machine installed on the Host. In some examples, SFEs 112A, 112B, 112C access corresponding encryptors/decryptors 114A, 114B, 114C when data received from network 108 (or to be delivered to network 108) is to be encrypted or decrypted. In some examples, SFE 112A, 112B, and 112C are configured to implement one or more logical networks within the SDDC 100 by controlling the manner in which packets/data received at the respective Host are to be forwarded. SFE 112A, 112B, 112C may operate as a security rule enforcement tool that enforces security rules, such as firewalls. In alternate embodiments, security rules may be enforced at other points along the datapath, such as at a virtual NIC 118A, 118B, 118C associated with each virtual machine or container, or virtual (software-implemented) ports, including uplink ports, associated with the software forwarding element.

In the illustrated example of FIG. 1, encryption agents 116A, 116B, 116C also installed on respective Hosts receive, via network 108, encryption rules/policies generated by the security and encryption policy and rule generating system 106 at management node 102. In certain embodiments, traffic between key managers 120, management nodes 102, and encryption agents 116 is communicated over a separate physical network (not separately shown) than the physical network of network 108 that handles production data communication, such as data communicated by virtual machines 110. In some examples, encryption keys are stored and managed by key manager node 120 coupled to network 108. The encryption keys are transmitted to encryption agents for usage by encryptors. In some examples, key manager 120 also periodically provides new encryption keys to the encryption agents for one or more of the encryption rules, for example, to make it harder for third parties to break the encryption scheme. Encryption agents 116A, 116B, 116C and encryptors/decryptors 114A, 114B, 114C operate collectively as encryption rule enforcement tools that enforce encryption rules at each respective Host. In some examples, firewall agents 117A, 117B, 117C also installed on respective Hosts, receive, via network 108, policies and rules generated by security and encryption policy and rule generating system 106 at management node 102. Virtual NICs 118A, 118B and 118C access a table(s) implemented at the firewall respective firewall agents 117A, 117B, 117C to obtain firewall policies/rules to be applied at corresponding ones of the guest virtual machines 110A, 110B. In further examples, one or more software defined firewalls are implemented at a hypervisor at each Host 104A, 104B, 104C having a guest virtual machine or destination endpoint affected by the firewall rules.

Although FIG. 1 depicts Host A 104A, Host B 104B, and Host C 104C as implementing guest virtual machines 110A, 110B, 110C, respectively, in some examples, a lighter-weight virtualization is employed by using containers in place of guest virtual machines 110A, 110B, 110C. Containers are software constructs such as namespaces for applications that run on top of a host operating system without the need for a hypervisor or a separate guest operating system. Unlike virtual machines, containers do not instantiate their own operating systems. Like virtual machines, the containers are logically isolated from one another and can have their own Layer 2 and Layer 3 (of the OSI model) network addresses. Numerous containers can run on a single computer, processor system and/or in the same development environment. Also like virtual machines, the containers can execute instances of applications or programs (e.g., an example application) logically isolated from application/program instances executed inside other containers.

Figure 2:
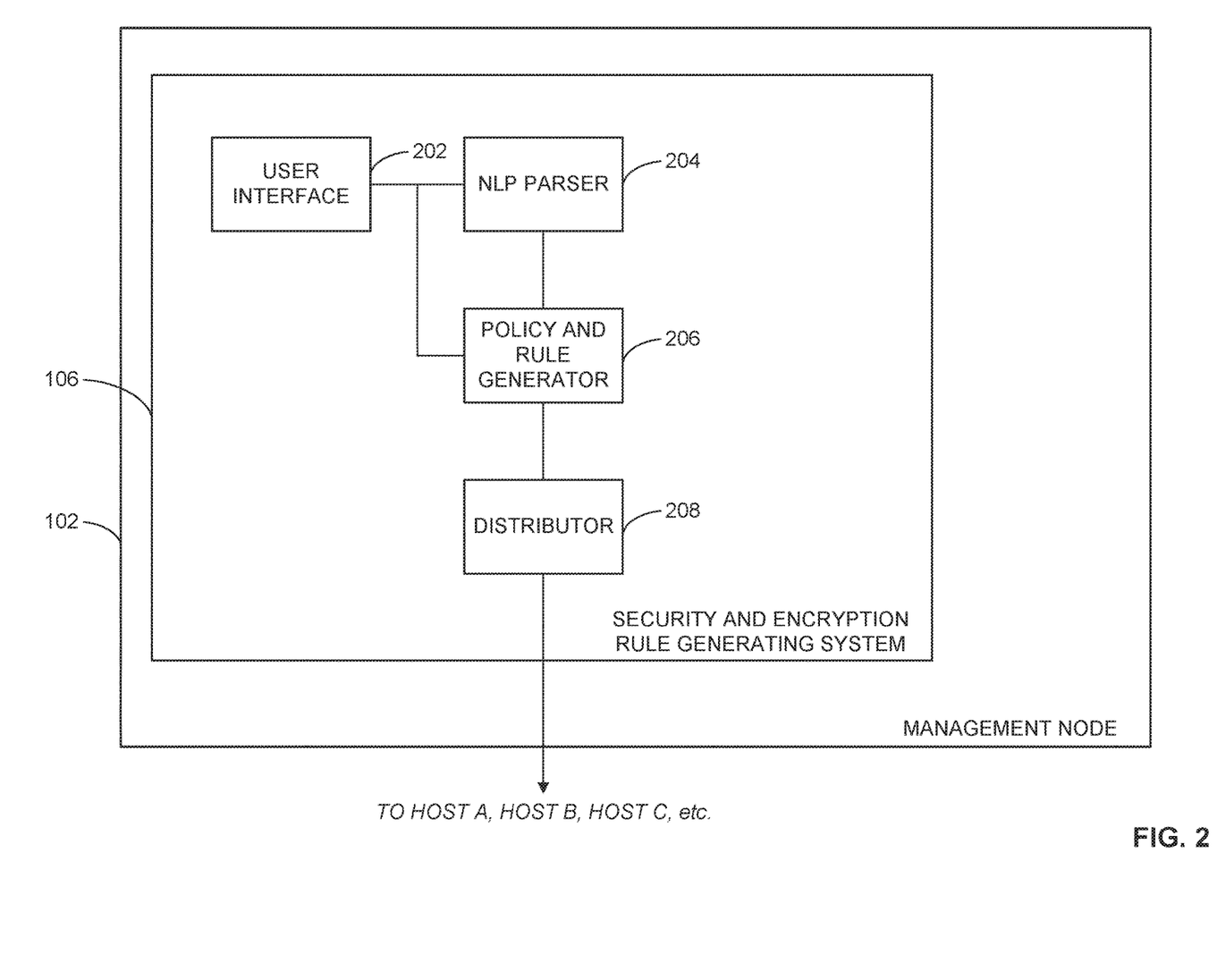
FIG. 2 illustrates an example security and encryption policy and rule generating system implemented using the example management node of FIG. 1.

FIG. 2 illustrates an example implementation of the security and encryption policy and rule generating system 104 implemented at example management node 102 of FIG. 1. In some examples, the example security and encryption policy and rule generating system 104 includes a user interface 202, a natural language processing (NLP) parser 204, a policy and rule generator 206, and a distributor 208. In some examples, user interface 202 is configured to present a display at which a user, such as a system administrator, enters a natural language statement identifying a desired policy to be implemented at the nodes (e.g., Host A 104A, Host B 104B, Host 104C) of the SDDC 100 of FIG. 1. In some examples, the user enters the natural language statement using a microphone and a software tool converts the spoken language to written text. In some examples, the user enters the natural language statement via a keyboard. A natural language statement, as used herein, refers to a statement that conforms to a natural language spoken by humans during everyday conversations. In contrast, a constructed language is a language that was developed to program computers/machines. Thus, the user can use natural language to formulate a natural language statement to identify a desired policy or rule and need not be specially trained in any particular constructed/computer language to use the security and encryption policy and rule generating system 106 of FIG. 1 and/or FIG. 2. An example natural language statement such as "block web servers to db servers," may be entered by a user intending to create a policy that will result in a firewall between a set of web servers and a set of database servers. The natural language statement entered via the user interface 202 is provided to the NLP parser 204 which uses artificial intelligence to parse the natural language statement into a set of key words. In some examples, NLP parser 204 is implemented using any available natural language processing parser hardware/software including a parser based on the nltk python language. For example, key words corresponding to the example natural language statement "block web servers to db servers" can include "block," "web" and "db."

In some examples, NLP parser 204 transmits the identified key words to policy/rule generator 206, which uses the key words to generate a corresponding policy/rule in a manner described further hereinbelow. Policy/rule generator 206 then causes distributor 208 to distribute the policy/rule to one or more encryption agents 116A, 116B, 116C residing at one or more of Host A 104A, Host B 104B and/or Host C 104C, respectively, for application/enforcement thereat.

Figure 3:
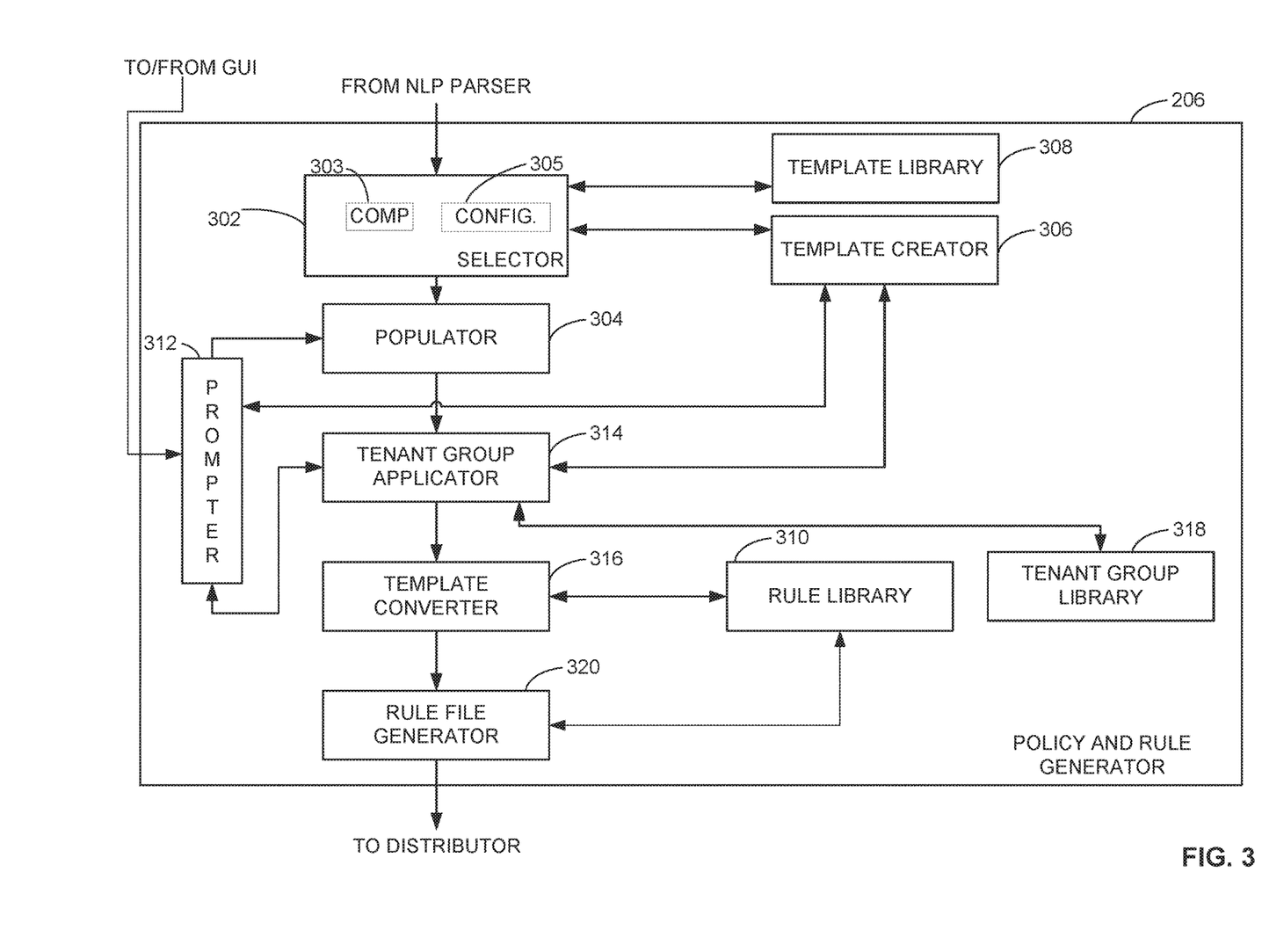
FIG. 3 illustrates an example policy/rule generator included in the security and encryption policy and rule generating system of FIG. 2.

FIG. 3 illustrates an example implementation of policy/rule generator 206 of FIG. 2. In some examples, policy/rule generator 206 includes a template selector 302, a field populator 304, a template creator 306, a template library 308, a rule library 310, a prompter 312, a tenant group applicator 314, a template converter 316, a tenant group library 318 and a rule file generator 320. In some examples, template selector 302 receives the set of key words identified by the NLP parser 204 (see FIG. 2) and uses the key words to identify a policy/rule template stored in template library 308 that corresponds to the key words. In some examples, the templates stored in template library 308 include a set of reference templates, each having a set of fields. In some examples, at least some of the fields of the templates are populated. In some such examples, template selector 302 identifies a policy/rule template corresponding to the key words by comparing the key words to information stored in one or more of the populated fields of the templates.

Figure 4A:
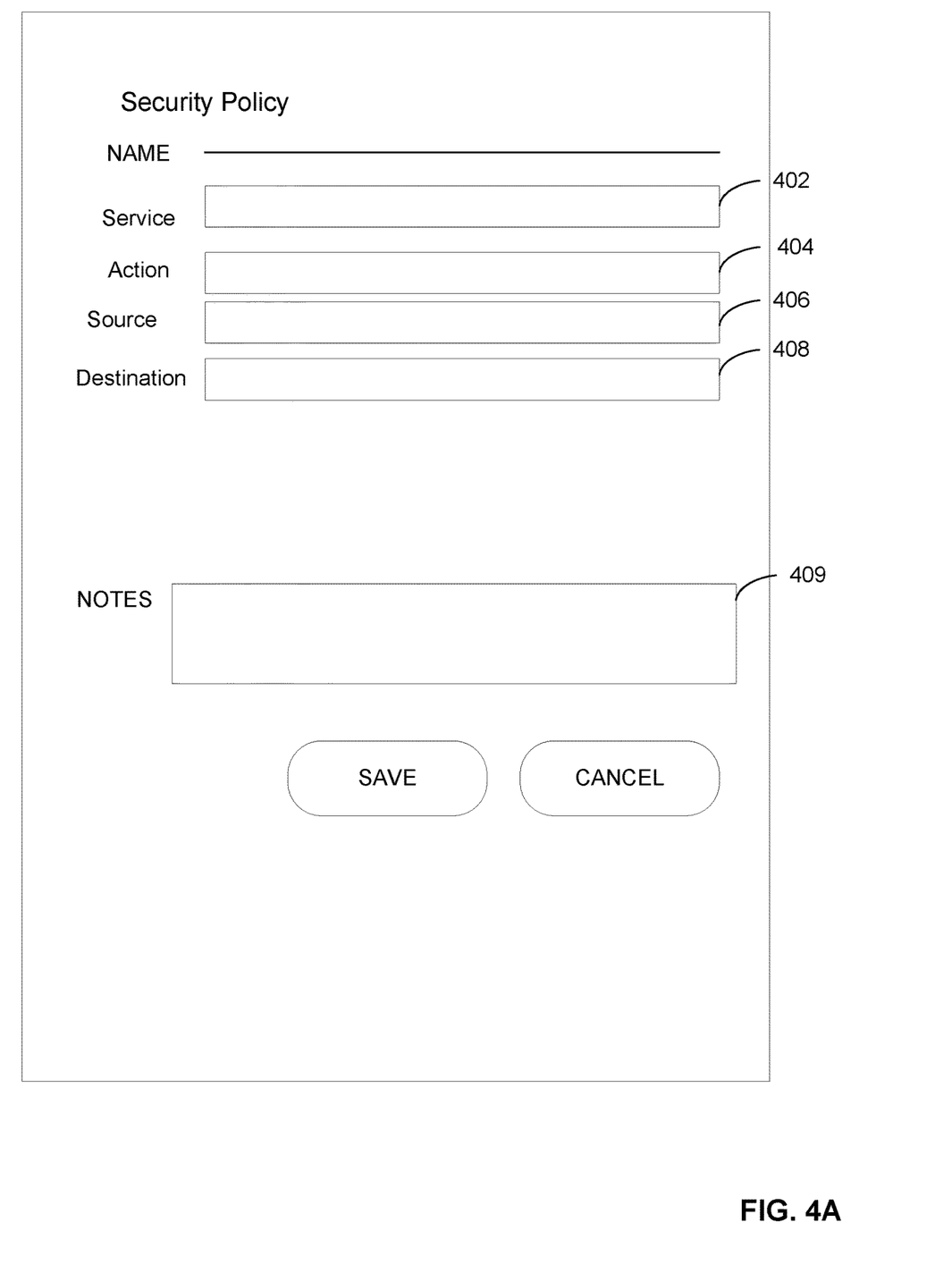
FIGS. 4A and 4B illustrate example distributed network encryption and security policy templates created using the example security and encryption policy and rule generating system of FIG. 2 and/or the example policy/rule generating system of FIG. 3.
Figure 4B:
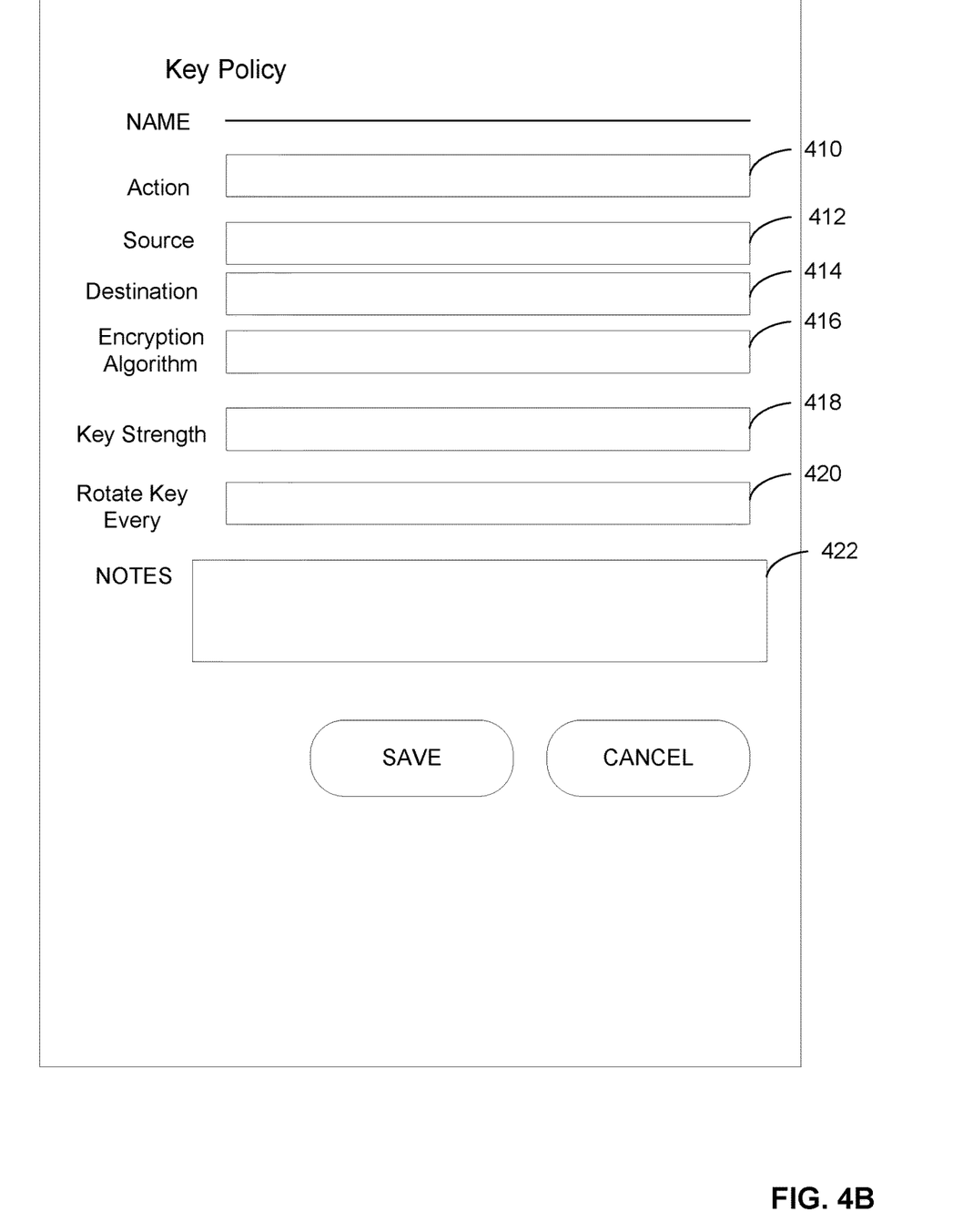

Referring also to FIG. 4A and FIG. 4B, in some examples, at least some of the set of reference templates represent distributed network security policies (see FIG. 4A) and/or at least some of the reference templates represent distributed network encryption policies (see FIG. 4B). In some such examples, network security reference templates 400A (see FIG. 4A) include a set of fields related to network security including, for example, a service field 402, an action field 404, a source field 406, an destination field 408, and a notes field 409 into which notes may be entered. Service field 402 identifies a service to which the policy/rule is to be applied. In some examples, the service can be represented as a network protocol and a port number (e.g., telnet 23). In some such examples, data traffic formatted according to the network protocol received at the identified port number will be subjected to the policy/rule. Action field 404 identifies an action (e.g., allow, deny, reject) to be applied to data traffic identified by the service in service field 402. Source field 406 identifies a source of data traffic and can be formatted as a network address of the source or a logical name of the source. Likewise, destination field 408 identifies a destination of data traffic and can be formatted as a network address of the destination and/or a logical name of the destination. In some examples, source/destination 406, 408 fields can be configured to accept a tag that identifies a role of a node within SDDC 100. For example, the tag can identify a node as being a Web application, a Database application, a User application, etc. In some examples, network encryption reference templates 400B (see FIG. 4B) can include a set of fields related to network encryption including, for example, an action field 410, a source field 412, a destination field 414, and an encryption cypher field 416. Action field 410 identifies an action (e.g., encrypt, do not encrypt) to be applied to data traffic transmitted between a source node identified in source field 412 and a destination node identified in destination field 414. Encryption cypher field 416 identifies an encryption cypher to be used when encrypting the data. In some examples, the template also includes a key strength field 418 that indicates a strength of the encryption key, a key rotation field 420 that indicates a frequency at which the key is to be rotated and a notes field 422 into which notes may be entered.

Referring still to FIG. 3, in some examples, when comparing the key words supplied by NLP parser 204, selector 302 includes a comparator 303 that compares the key words to information entered into one or more of the individual fields of the set of reference templates. For example, comparator 303 can be configured to compare the key words to the contents of the service field 402 and the action field 404 of the reference templates. For example, the comparator 303, when comparing the keywords "telnet23" and "allow" to the contents of the template fields, will attempt to identify a template having an action field 404 populated with "allow" and having a service field 402 populated with "telnet23." If a reference template meeting this description is identified, based on comparing the keywords to the contents of at least some of the reference template fields 402, 404, 406, 408, a configurer 305 of selector 302 selects the identified reference template as a match for the key words. In some examples, the key words must match a threshold number of fields of a reference template before the template will be considered a matching template. In some examples, the key words must match the contents of specific fields (e.g., service, action) of a reference template before the template will be considered a match. The selected (e.g., matching) template and keywords are provided to field populator 304 which uses the remaining keywords supplied by NLP parser 204, if any, to populate corresponding fields of the selected template. For example, the keywords related to source field 406 and destination field 408, if any, are placed by field populator 304 into the fields of the selected template. In some examples, field populator 304 identifies fields that remain unpopulated, if any, to prompter 312, which generates a prompt to the user to enter data into the unpopulated fields. Such a prompt can identify the fields that remain unpopulated and include a request to the user to enter information into the unpopulated fields. In some examples, the prompt includes suggested values to be entered into the unpopulated fields of the selected template. The request (or prompt) is displayed to the user via graphical user interface 202 (FIG. 2).

After the fields of the selected template have been populated, populator 304 supplies the populated template to tenant group applicator 314. Tenant group applicator 314 identifies sets of tenant groups by name and supplies the tenant group names to graphical user interface 202 (see FIG. 2) for display to the user. The tenant group represents a set of network nodes at which the rule will be applied and are typically disposed in the network between the source node and the destination node. Tenant groups are stored in tenant group library 318. The user replies by selecting one or more of the displayed tenant groups and/or opts to create a new tenant group. If the user selects one or more of the tenant user groups displayed on graphical user interface 202, tenant group applicator 314 responds to the selection by supplying information identifying nodes in the selected tenant groups and the selected, populated template to the template converter 316. Template converter 316 then uses the selected, populated template and the set of nodes included in the selected tenant group to generate a set of rules corresponding to the template and causes the rules to be displayed at graphical user interface 202. For example, the template may indicate that a firewall is to be created between a network entity associated with the tag "Web" and a network entity associated with the tag "db." In some such examples, the tag "Web" refers to a web server and the tag "db" refers to a database server. In some such examples, the tenant group includes nodes that carry data traffic between the web server and the database server and represent nodes at which the policies/rules will be enforced.

In some examples, the user elects to create a new tenant group at which the policy is to be applied by selecting the appropriate option (e.g., "create new user group") via the graphical user interface 202. Referring to the preceding firewall example, in some such examples in which the user elects to create a new tenant group, tenant group applicator 314 identifies (and causes the graphical user interface to display) network nodes that carry traffic between the tagged/identified web server and the tagged/identified database server. The network nodes can include virtual machines, logical ports and logical switches. The user selects the nodes at which the policy is to be enforced and also provides a tenant group name for the nodes. Tenant group applicator 314 causes the newly defined tenant group to be stored in the tenant group library with the user-identified tenant group name. In addition, tenant group application 314 supplies the newly defined tenant group and the selected, populated template to the template converter 316, which converts the information into a set of rules that will be used to enforce the policy.

In some examples, template converter 316 converts the supplied template and selected/created tenant group information to a set of rules by accessing rule library 310. In some examples, rule library 310 contains a set of rules corresponding to each template. The rules include placeholders into which the specific information entered into a template can be substituted/populated and/or specific tenant group node information is substituted/populated. The user is provided an option to select any of the set of rules using, for example, a radial button or check box via graphical user interface 202. In an example in which the user desires to create a firewall between a web server (implemented with a first virtual machine "VM1" and a logical switch "LS1") and a database server (implemented with a second virtual machine "VM2") and the user has selected a first tenant group ("TG1"), the set of rules generated for display can include: 1) Deny ANY from VM1 to VM2 direction IN applied on TG1, 2) Deny ANY from VM1 to VM2 direction OUT applied on TG1, 3) Deny ANY from VM1 to VM2 direction IN/OUT applied on TG1, 4) Deny ANY from VM1 to LS1 direction IN applied on TG1, 5) Deny ANY from VM1 to LS1 direction OUT applied on TG1, and 6) Deny ANY from VM1 to LS1 direction IN/OUT applied on TG1. Further each rule can have a corresponding selection box to be checked or unchecked by the user as desired.

Referring still to FIG. 3, the selected rules are supplied to file generator 320 which converts the selected and populated rules to a set of text files in a data exchange format, such as a Java Script Object Notation (JSON) format, or a protobuf format, and inserts the text files into the payload of a rest Application Programming Interface (API). In some examples, the rest APIs are then supplied to distributor 208 for distribution to one or more of the Host nodes (or any other network node) at which the rule will be enforced as described above with reference to FIG. 1. In some examples, file generator 320 converts rules into text files by accessing rule library 310. In some such examples, rule library 310 stores a text file in association with each rule and file generator 320 performs the conversion by inserting the information contained in the selected rules into corresponding placeholders contained in the text file. Thus, in advance of using the system, a set of rules and corresponding text files are generated and stored in the rule library. As described, the text files and the rules include placeholders into which the template fields are inserted.

In some examples, selector 302 determines that none of the reference templates in template library 308 match the key words supplied by NLP parser 204 (FIG. 2). In some such examples, template creator 306 generates a new template. In some such examples, template creator 306 causes prompter 312 to prompt the user (via graphical user interface 202) to identify whether the network policy/rule is to be a network security policy/rule or an encryption policy/rule. In response to user input identifying either network security (e.g., a firewall) or encryption, template creator 306 creates a new template having fields related to the type of policy/rule specified by the user. Template creator 306 supplies the newly created template to populator 304, which responds by populating the empty fields of the newly created template with the keywords supplied by selector 302. If populator 304 is unable to determine an appropriate field into which a key word is to be inserted, populator 304 supplies the key words to the prompter 312, which prompts the user, via graphical user interface 202, to identify a correspondence between the key words and the field of the newly created template. In response to the user input, populator 304 populates the fields of the newly created template. In some examples, template generator 306 causes the completed template to be stored in template library 308 for future usage. In some examples, prompter 312 is configured to prompt the user for any information to be entered into any number of template fields 402, 404, 406, 408.

While example manners of implementing the example system of FIG. 1 have been illustrated in FIG. 2 one or more of the elements, processes and/or devices illustrated in FIG. 1 and FIG. 2 can be combined, divided, re-arranged, omitted, eliminated and/or implemented in any other way. Further, any of the security and encryption rule generating system 106, the user interface 202, the NLP parser 204, the policy and rule generator 206, the distributor 208, the selector 302, the comparator 303, the populator 304, the configurer 305, the template creator 306, the template library 308, the rule library 310, the prompter 312, the tenant group applicator 314, the template converter 316, the tenant group library 318, the file generator 320, and/or, more generally, the management node 102 may be implemented by hardware, software, firmware and/or any combination of hardware, software and/or firmware. Thus, for example, any of the security and encryption rule generating system 106, the user interface 202, the NLP parser 204, the policy and rule generator 206, the distributor 208, the selector 302, the comparator 303, the populator 304, the configurer 305, the template creator 306, the template library 308, the rule library 310, the prompter 312, the tenant group applicator 314, the template converter 316, the tenant group library 318, the file generator 320, and/or, more generally, the management node 102 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus or system claims of this patent are read to cover a purely software and/or firmware implementation at least one of the security and encryption rule generating system 106, the user interface 202, the NLP parser 204, the policy and rule generator 206, the distributor 208, the selector 302, the comparator 303, the populator 304, the configurer 305, the template creator 306, the template library 308, the rule library 310, the prompter 312, the tenant group applicator 314, the template converter 316, the tenant group library 318, the file generator 320, and the management node 102 are hereby expressly defined to include a tangible computer readable medium such as a memory, digital versatile disk (DVD), compact disk (CD), etc., storing such software and/or firmware. Further still, the example SDDC 100 of FIG. 1 may include one or more elements, processes and/or devices in addition to, or instead of, those illustrated in FIG. 1 and FIG. 2, and/or may include more than one of any or all of the illustrated elements, processes and devices.

Figure 5:
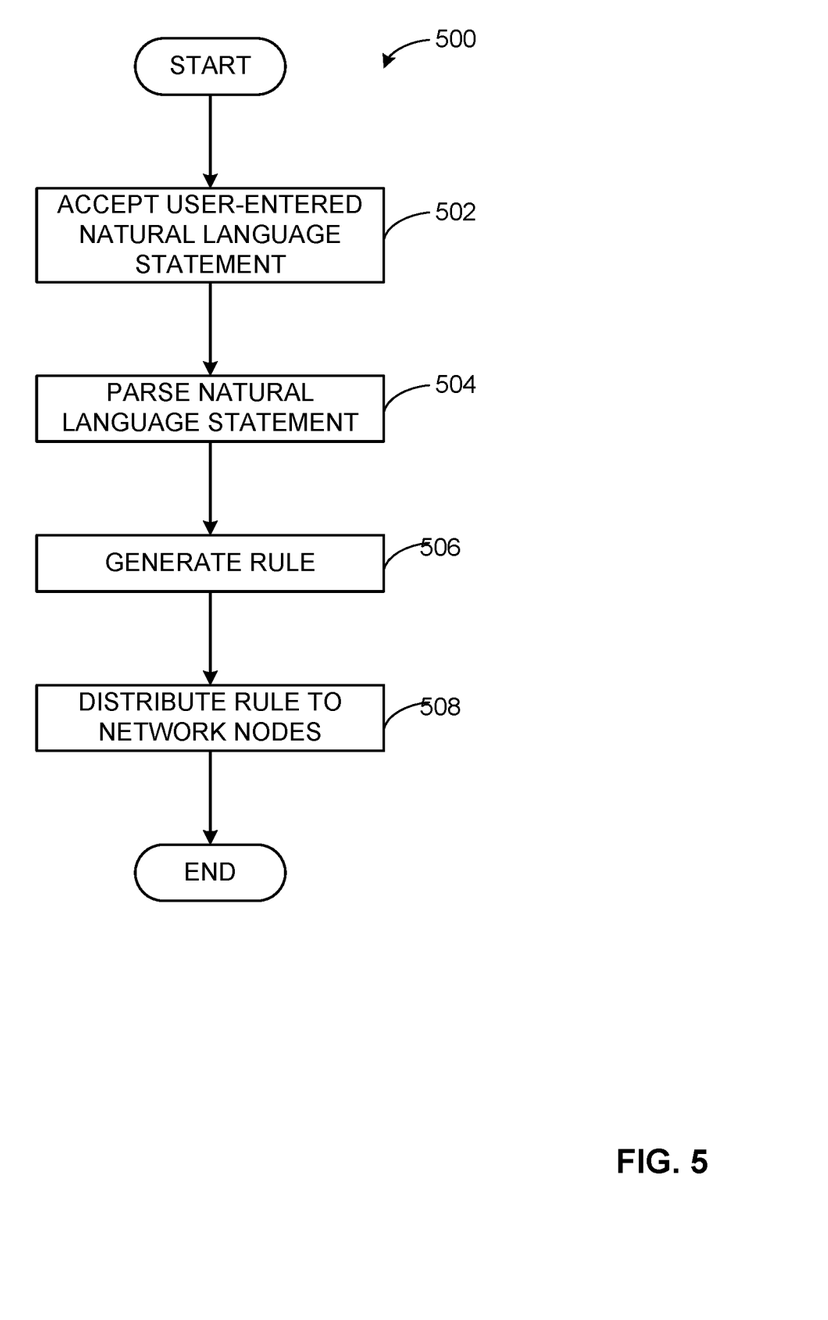
FIG. 5 is a flowchart representative of example computer readable instructions that may be executed to implement the example security and encryption policy and rule generating system of FIG. 2.
Figure 6A:
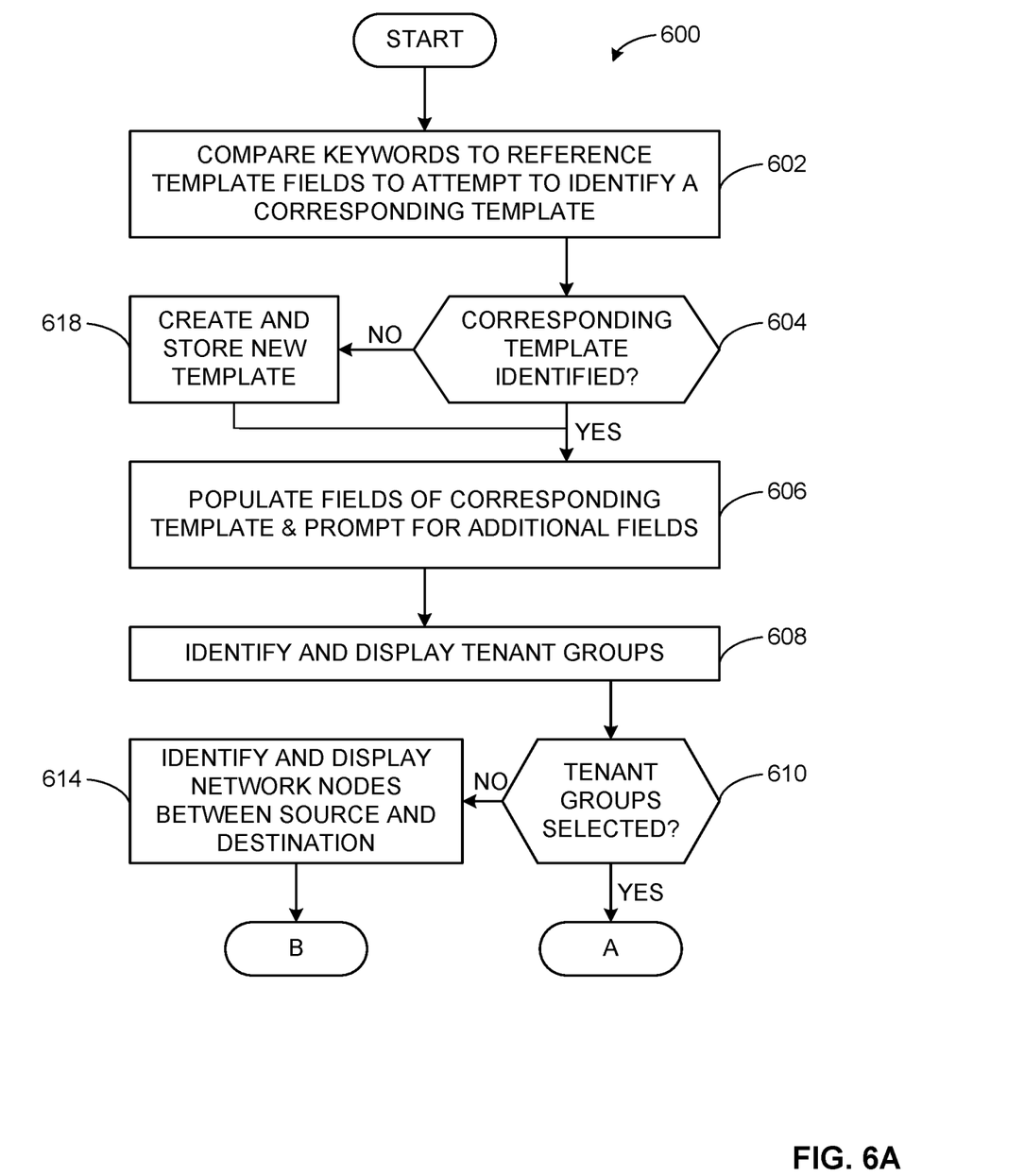
FIG. 6A and FIG. 6B collectively illustrate a flowchart representative of example computer readable instructions that may be executed to implement the example policy/rule generator of FIG. 3.
Figure 6B:
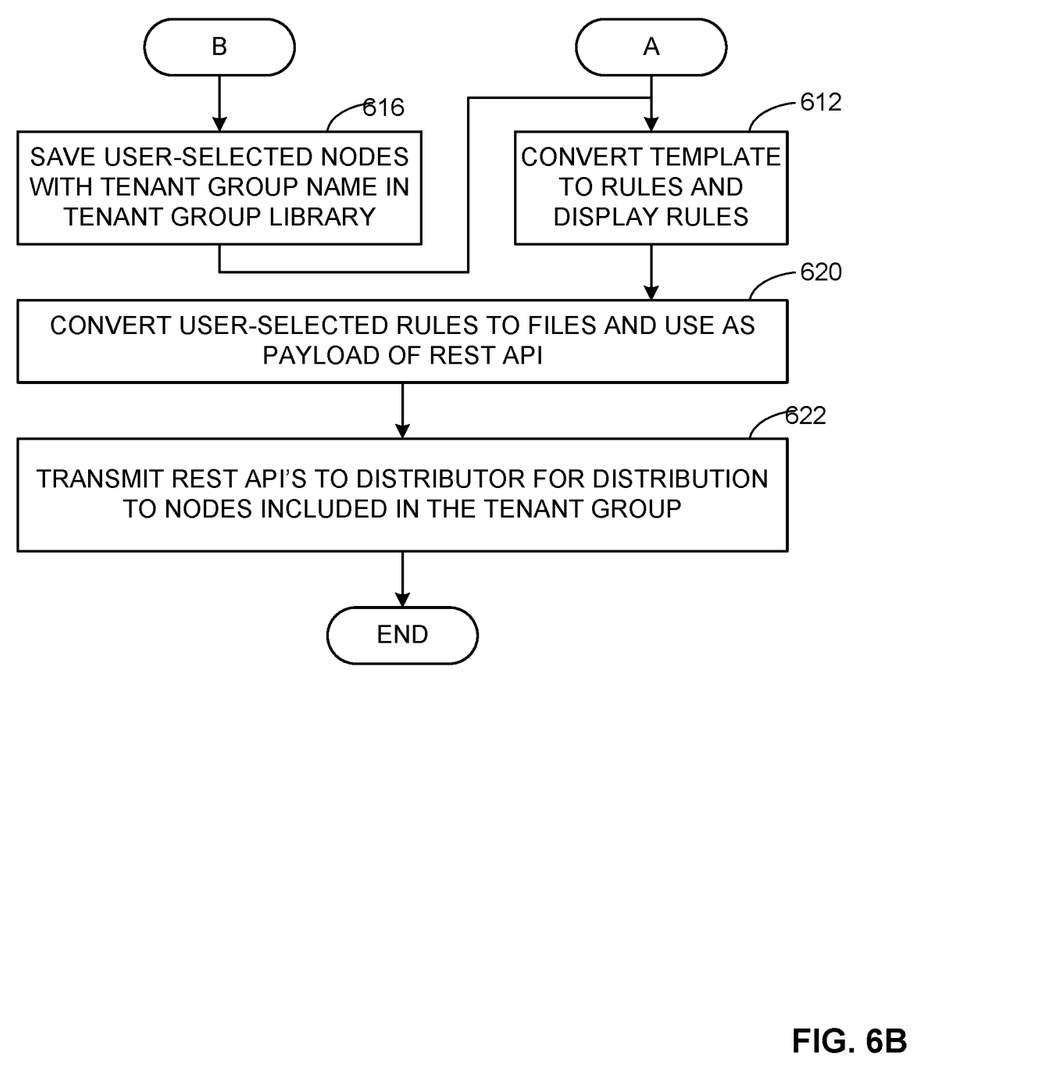

Flowcharts representative of example machine readable instructions for implementing security and encryption rule and generating system 106 of FIGS. 1, 2, and/or 3 are shown in FIGS. 5, 6A and 6B. In this example, the machine readable instructions comprise a program for execution by a processor such as the processor 712 shown in the processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the program is described with reference to the flowcharts illustrated in FIGS. 5, 6A and 6B, many other methods of implementing management node 102, security and encryption rule generating system 106 and/or policy and rule generator 206 may alternatively be used. For example, the order of execution of the blocks may be changed, and/or some of the blocks described may be changed, eliminated, or combined.

As mentioned above, the processes of FIGS. 5, 6A and 6B may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the processes of FIGS. 5, 6A and 6B may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

Example machine readable instructions 500 that may be executed to implement security and encryption rule generating system 106 of FIGS. 1, 2 and/or 3 are illustrated by the flowchart shown in FIG. 5. Machine readable instructions 500 may be executed periodically and/or aperiodically (e.g., at predetermined intervals, based on an occurrence of a predetermined event, or any combination thereof). Machine readable instructions 500 begin execution at a block 502 of FIG. 4 at which graphical user interface 202 (see FIG. 2) receives a natural language statement entered by a user (e.g., a system administrator). The natural language statement identifies a desired policy to be implemented at one or more Host nodes of the SDDC 100 (see FIG. 1). NLP parser 204 (see FIG. 2) uses artificial intelligence to parse the natural language statement into a set of key words (block 504). Policy/rule generator 206 (see FIG. 2) uses the key words to generate a corresponding policy/rule (block 506). Distributor 208 distributes the corresponding policy/rule to encryption agents 116A, 116B, 116C residing at one or more of the Host nodes for application/enforcement thereat (block 508). After the rule has been provided to the nodes of the SDDC 100, the program ends.

Example machine readable instructions 600 that may be executed to implement policy and rule generator 206 of FIGS. 2 and 3 are illustrated by the flowchart shown in FIGS. 6A and 6B. Machine readable instructions 600 may be executed periodically and/or aperiodically (e.g., at predetermined intervals, based on an occurrence of a predetermined event, or any combination thereof). Machine readable instructions 600 begin execution at a block 602 of FIG. 6A at which template selector 302 (see FIG. 3) compares the key words identified by NLP parser 204 (see FIG. 2) to information stored in one or more of the populated fields of the set of reference templates stored in template library 308 (see FIG. 3) to attempt to identify an existing policy/rule template corresponding to the key words. If an existing policy/rule template corresponding to the key words is identified (block 604), the corresponding/matching template is selected and supplied (with the keywords that are not yet entered into the template, if any) to field populator 304 (see FIG. 3), which uses the keywords to populate corresponding fields of the selected template (block 606). Field populator 304 also identifies fields that remain unpopulated, if any, to prompter 312 which generates a prompt to the user to enter data into the unpopulated fields (also at block 606). Next, field populator 304 supplies the populated template to tenant group applicator 314 (see FIG. 3), which identifies a set of tenant groups by name and supplies the tenant group names to graphical user interface 202 (see FIG. 2) for display to the user (block 608). If the user selects one or more of the tenant user groups displayed on graphical user interface 202 (block 610), tenant group applicator 314 responds to the selection by supplying information identifying nodes in the selected tenant groups and the selected, populated template to the template converter 316, which uses the selected, populated template and the set of nodes included in the selected tenant group to generate a set of rules corresponding to the template (block 612 of FIG. 6B). Template converter 316 also causes the rules to be displayed at graphical user interface 202 (also block 612). In some examples, the user elects to create a new tenant group instead of, or in addition to, selecting from a previously created tenant group (block 610 of FIG. 6A). In some such examples, tenant group applicator 314 identifies network nodes that carry traffic between the source and the destination nodes (e.g., located between the source and destination nodes identified in the populated template) and causes the nodes to be displayed at graphical user interface 202 (block 614). In some examples, tenant group applicator 314 identifies the nodes to be displayed to the user (e.g., located between the source and destination nodes identified in the populated template) by accessing a network topology database managed by management node 102. Tenant applicator 314 causes the nodes selected by the user to be saved as a new tenant group in tenant group library 318 with a user-identified tenant group name (block 616). Thereafter, the program returns to the block 612 and blocks subsequent thereto.

After displaying the rules via graphical user interface 202, template converter 316 supplies the selected rules to file generator 320 which converts the selected rules to a set of text files in a data exchange format, such as, a JSON format, and inserts the JSON files into the payload of a rest API (block 620 of FIG. 6B). In some examples, the rest APIs are then supplied to distributor 208 for distribution to the network nodes at which the rule will be enforced (block 622).

Returning to FIG. 6A, if at the block 604, selector 302 determines that none of the reference templates in template library 308 match the key words supplied by NLP parser 204 (FIG. 2), selector 302 notifies template creator 306, which creates a new template based on input supplied by the user identifying whether the network policy/rule is to be a network security policy/rule or an encryption policy/rule (block 618). The resulting template created by template creator 306 includes fields related to the type of policy/rule specified by the user. Template creator 306 supplies the newly created template to populator 304, which responds by populating the empty fields of the newly created template with the keywords supplied by selector 302, as described above in connection with the block 606 and blocks subsequent thereto. In addition, template creator 306 causes the template to be stored in template library 308 for future usage (also at the block 618).

Figure 7:
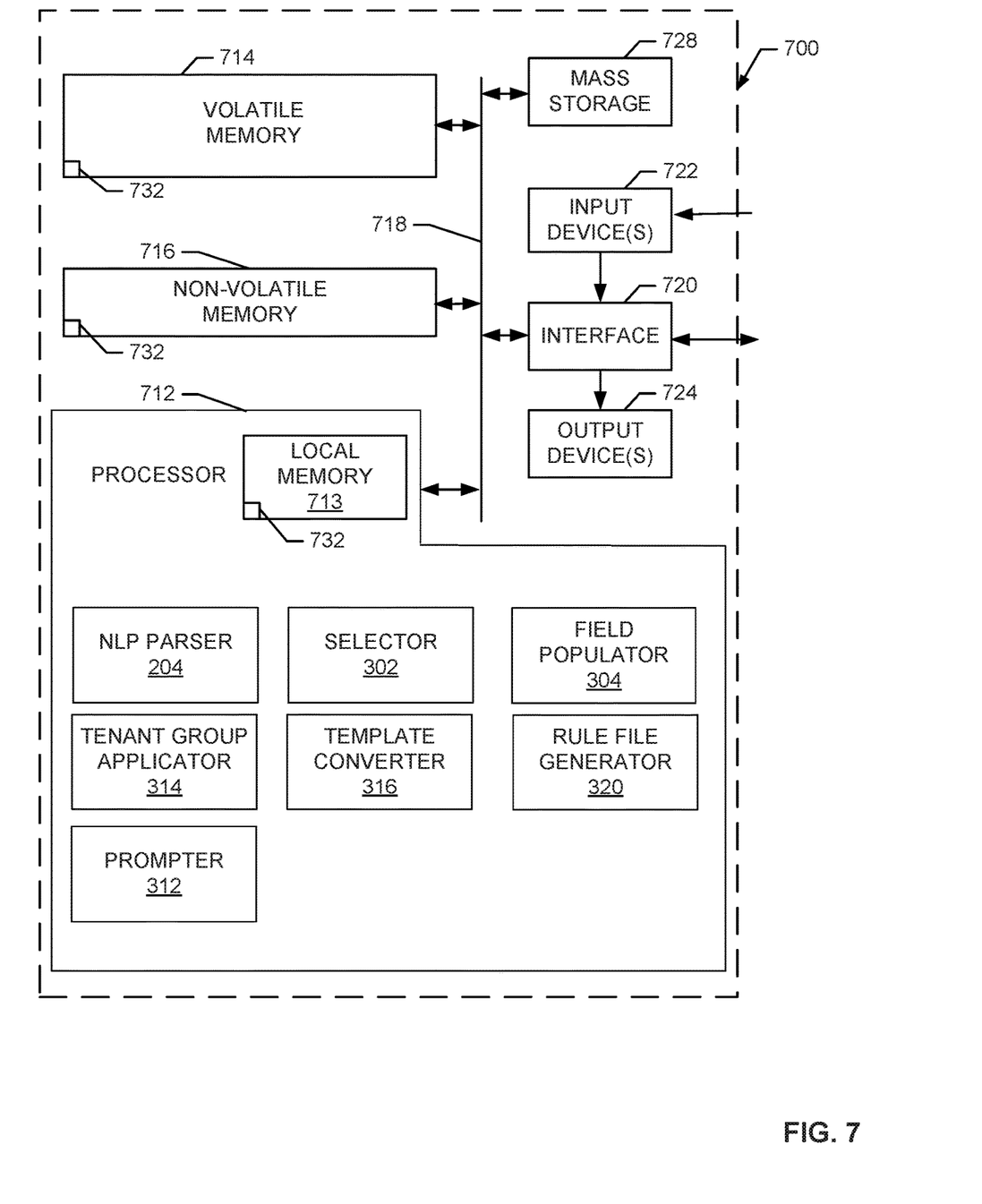
FIG. 7 is a block diagram of an example processing platform structured to execute the example computer readable instructions of FIGS. 5, 6A and 6B to implement the example security and encryption policy and rule generating system of FIG. 3.

FIG. 7 is a block diagram of a processor platform 700 capable of executing the instructions of FIGS. 5, 6A and 6B to implement security and encryption rule generating system 106 of FIGS. 1, 2 and/or 3. Processor platform 700 can be, for example, a server, a personal computer, an Internet appliance, and/or policy and rule generator 206, and/or any other type of computing device.

Processor platform 700 of the illustrated example includes a processor 712. Processor 712 of the illustrated example is hardware. For example, processor 712 can be implemented by one or more integrated circuits, logic circuits, microprocessors or controllers from any desired family or manufacturer. Processor 712 can be used to implement parser 204, selector 302, comparator 303, populator 304, configurer 305, prompter 312, tenant group applicator 314, template converter 316, and rule file generator 320 of FIGS. 1 and 2.

Processor 712 of the illustrated example includes a local memory 713 (e.g., a cache). Processor 712 of the illustrated example is in communication with a main memory including a volatile memory 714 and a non-volatile memory 716 via a bus 718. Volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. Non-volatile memory 716 may be implemented by flash memory and/or any other desired type of memory device. Access to main memory 714, 716 is controlled by a memory controller. Any of random access memory device 714 and mass storage 728 can be used to implement template library 308, rule library 310, and tenant group library 318 of FIG. 3.

Processor platform 700 of the illustrated example also includes an interface circuit 720. Interface circuit 720 may be implemented by any type of interface standard, such as an Ethernet interface, a universal serial bus (USB), and/or a PCI express interface.

In the illustrated example, one or more input devices 722 are connected to interface circuit 720. Input device(s) 722 permit(s) a user to enter data and commands into processor 712. Input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to interface circuit 720 of the illustrated example. Output devices 724 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). Interface circuit 720, thus, typically includes a graphics driver card, a graphics driver chip or a graphics driver processor.

Interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system). Interface circuit 720 can be used to implement either of graphical user interface 202, and/or distributor 208.

Processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives. In some examples, mass storage 728 can be used to implement template library 308, rule library 310, and tenant group library 318 of FIG. 3.

Coded instructions 732 of FIGS. 5, 6A and 6B may be stored in mass storage device 728, in volatile memory 714, in non-volatile memory 716, and/or on a removable tangible computer readable storage medium such as a CD or DVD.

From the foregoing, it will be appreciated that the above disclosed example methods, systems, apparatus and articles of manufacture provide advantages in the area of software defined data centers and, more particularly, in the area of private software defined data centers that are implemented within multi-tenant clouds. For example, the security and encryption policy and rule generating system disclosed herein provides network administrators with a simplified, user-friendly tool for use in defining and implementing policies and rules to be applied at the nodes of the distributed network within the software defined data center. In some disclosed examples, the security and encryption policy and rule generating system includes a natural language parser that uses artificial intelligence to parse a natural language statement into a set of keywords. A selector then uses the keywords to identify a matching policy template from among a set of reference templates. A prompter prompts the user to enter information into unpopulated fields of the matching template and further assists the user in identifying a set of network nodes (e.g., a tenant group) to be assigned to enforce the policy. The matching policy template is then converted into a set of rules displayed to the administrator for selection. Selected rules are then converted to a set of rule files and incorporated into the payload of a rest API for transmission to the network nodes to enforce the rules. Due to the user-friendly policy defining interface, example systems disclosed herein permit the definition and application of policies/rules without requiring special expertise in a computer language. Further, the disclosed example systems assist the user in identifying network nodes between a source and destination node at which the rules/policies are to be enforced.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

We claim:

1. An apparatus, comprising:
a language parser including artificial intelligence to parse a natural language statement into a set of key words;
a comparator to compare the set of key words to a set of respective reference policy templates;
a template creator to create a new policy template in response to the comparator determining a subset of the key words does not match threshold numbers of respective fields of any of the set of reference policy templates, the new policy template to be at least one of a distributed network encryption type of policy template or a distributed network security type of policy template, the type of policy template specified via a user interface;

a field populator to automatically populate one or more fields of the new policy template based on at least some of the key words; and a policy distributor to distribute a policy rule defined by the new policy template for enforcement at network nodes of a software defined data center, at least one of the language parser, the comparator, the template creator, the field populator or the policy distributor implemented by at least one hardware processor.

2. The apparatus of claim 1, wherein the respective fields in the new policy template of the set of reference policy templates include an action field identifying an action to be taken by a rule enforcement tool, a service field identifying a service to be affected by the policy rule, a source field identifying a source node of the software defined data center and a destination field identifying a destination node of the software defined data center.

3. The apparatus of claim 1, wherein the key words include a first key word identifying a service to be affected by the policy rule and a second key word identifying an action to be taken by a rule enforcement tool.

4. The apparatus of claim 3, wherein the new policy template includes a service field corresponding to the first key word and further includes an action field corresponding to the second key word.

5. The apparatus of claim 1, wherein the field populator is further to prompt a user to enter information into an unpopulated field of the new policy template.

6. A method to define a policy rule in a software defined data center, the method comprising:

parsing, by executing an instruction with a processor, a natural language statement into a set of key words using artificial intelligence, the natural language statement to define at least one of a distributed network encryption policy or a distributed network security policy;

creating, by executing an instruction with the processor, a new policy template in response to determining the set of key words does not match threshold numbers of respective fields of any of a set of reference policy templates, the new policy template to be a distributed network encryption type of policy template or a distributed network security type of policy template, the type of policy template specified via a user interface;

automatically populating, by executing an instruction with the processor, one or more fields of the new policy template based on at least some of the set of key words; and distributing a policy rule defined by the new policy template for enforcement at network nodes of the software defined data center, the policy rule at least one of a distributed network encryption policy rule or a distributed network security policy rule.

7. The method of claim 6, further including comparing ones of the key words to ones of the respective fields in a first policy template to determine whether the ones of the key words correspond to a threshold number of the respective fields in the first policy template.

8. The method of claim 7, wherein the respective fields in the first policy template include an action field identifying an action to be taken by a rule enforcement tool, a service field identifying a service to be subject to the policy rule, a source field identifying a source node of the software defined data center and a destination field identifying a destination node of the software defined data center.

9. The method of claim 7, wherein the key words include a first key word identifying a service to be affected by the policy rule and a second key word identifying an action to be taken by a rule enforcement tool.

10. The method of claim 9, wherein the first policy template includes first information stored in a service field, the first information corresponding to the first key word, and the first policy template further includes second information stored in an action field, the second information corresponding to the second key word.

11. The method of claim 6, further including prompting a user to enter information into an unpopulated field of the new policy template.

12. A tangible computer readable storage medium comprising computer readable instructions that, when executed, cause one or more processors to at least:

parse a free form language statement into a set of key words using artificial intelligence;

compare the set of key words to a set of reference policy templates;

create a new policy template in response to determining the set of key words parsed from the free form language statement does not match threshold numbers of respective fields of any of the set of reference policy templates, the new policy template to be a distributed network encryption type of policy template or a distributed network security type of policy template, the type of policy template specified via a user interface;

automatically populate one or more fields of the new policy template based on at least some of the key words parsed from the free form language statement; and distribute a policy rule defined by the new policy template for enforcement at network nodes of a software defined data center.

13. The tangible computer readable storage medium of claim 12, wherein the respective fields in a first policy template of the set of reference policy templates include an action field identifying an action to be taken by a rule enforcement tool, a service field identifying a service to be subject to the policy rule, a source field identifying a source node of the software defined data center, and a destination field identifying a destination node of the software defined data center.

14. The tangible computer readable storage medium of claim 12, wherein the key words include a first key word to identify a service to be affected by the policy rule and a second key word to identify an action to be taken by a rule enforcement tool.

15. The tangible computer readable storage medium of claim 14, wherein the new policy template includes a service field populated with the first key word and an action field populated with the second key word.

16. The tangible computer readable storage medium of claim 12, wherein the computer readable instructions further cause the one or more processors to generate a prompt to enter information into an unpopulated field of at least one of a first policy template or the new policy template.

* * * * *